United States Patent [19]

Chao et al.

[11] Patent Number: 5,058,116
[45] Date of Patent: Oct. 15, 1991

[54] PIPELINED ERROR CHECKING AND CORRECTION FOR CACHE MEMORIES

[75] Inventors: Hu H. Chao, Pleasantville, N.Y.; Jung-Herng Chang, Saratoga, Calif.

[73] Assignee: International Business Machines Corporation, Armonk, N.Y.

[21] Appl. No.: 409,362

[22] Filed: Sep. 19, 1989

[51] Int. Cl.$^5$ .................................. H03M 13/00
[52] U.S. Cl. .......................... 371/40.2; 371/40.1; 371/38.1
[58] Field of Search ............ 371/40.2, 40.1, 37.2, 371/38.1

[56] References Cited

U.S. PATENT DOCUMENTS

| | | | |
|---|---|---|---|
| 4,661,955 | 4/1987 | Arlington et al. | 371/38 |
| 4,672,614 | 6/1987 | Yoshida | 371/40.2 |
| 4,689,792 | 8/1987 | Traynor | 371/37.2 |
| 4,730,319 | 3/1988 | David et al. | 371/68.3 |
| 4,748,627 | 5/1988 | Ohsawa | 371/40.2 |
| 4,920,539 | 4/1990 | Albonesi | 371/40.2 |
| 4,953,164 | 8/1990 | Asakura et al. | 371/40.2 |

Primary Examiner—Jerry Smith
Assistant Examiner—Phung My Chung
Attorney, Agent, or Firm—Whitham & Marhoefer

[57] ABSTRACT

A single error correction, double error detection function for cache memories does not affect the normal cache access time the addition of the ECC function. Check bits are provided for multiple bytes of data, thereby lowering the overhead of the error detecting and correcting technique. When a single error is detected, a cycle is inserted by the control circuitry of the cache chip. At the same time, the clocks for the CPU are held high until released by the cache chip on the next cycle. Error correction on multi-byte data is performed using the 72/64 Hamming code. The technique requires a 2-port cache array (one write port, and one read port). However, the density of a true 2-port array is too low; therefore, the technique is implemented with a 1-port array using a time multiplexing technique, providing an effective 2-port array but with the density of a single port array.

4 Claims, 5 Drawing Sheets

PIPELINED ERROR CHECKING AND CORRECTION FOR CACHE MEMORIES

DESCRIPTION

BACKGROUND OF THE INVENTION

1. Field of the Invention

The present invention generally relates to error checking and correction (ECC) in general purpose digital computers and, more particularly, to an implementation of pipelined ECC in cache memories.

2. Description of the Prior Art

Cache memories are high-speed buffer storage containing frequently accessed instructions and data. Such memories are typically used between the central processing unit (CPU) of a computer system and bulk or main storage and/or direct access storage devices (DASDs) which have a much longer access time than the cache memories. Thus, the purpose of cache memories is to reduce access time and thereby maximize the processing efficiency of the CPU.

As the cache size increases and memory cell size decreases, the soft error rate of the cache can increase significantly. This poses an important reliability problem for many applications.

ECC schemes for single error correction and double error detection that guard against soft errors for most cache applications are known in the art. To write, the data goes to an ECC-bit generation circuit (e.g., Hamming circuitry if a Hamming code is used) to generate ECC bits which are then written into the cache array with the data. To read, the data and the ECC bits go to the Hamming circuitry to generate the syndrome bits which are used as the input to a decoder. The output of the decoder is then exclusive-ORed with the data to correct any single incorrect bit. Error flags for single error and double error are also generated by the decoder. When a single error flag is detected, the corrected data and address are latched. The single error in the cache array is then corrected by writing the corrected data back into the cache array. When a double error flag is detected, the system may not be recoverable; however, the probability of that happening is so low that it is not a practical concern.

There is one more complication for the implementation of the ECC, and that is the minimum unit for STORE is a byte for most general purpose digital computer architectures (e.g., IBM S/370, DEC VAX, Intel 80386, etc.). Therefore, a straightforward implementation of the ECC cache is to use the 13/8 Hamming code to have separate check bits (ECC bits) for error correction on each byte. However, the overhead of this approach is very large. Error correction on wider data is more practical; e.g., the 72/64 or 137/128 Hamming code implementation.

FIG. 1 illustrates the data flow for a straightforward implementation of an ECC cache with 72/64 Hamming code. The operation of this cache is best understood by going through the data flow for a STORE operation. Assuming what we want to do is to store a byte which is the second byte in a double word with address A3, the operations needed to accomplish this are as follows:

1) Read out the double word and the associated check bits from the cache array 12 at address A3 (current content of the memory address register (MAR) 11);

2) Run through the Hamming circuitry ECC2 13;

3) Merge at 14 with the data from the CPU; i.e., replace the second byte of the data with the new data from the CPU;

4) Generate the check bits by Hamming circuitry ECC1 15; and

5) Write the result (the new double word and associated check bits) back to the cache array 12.

The problem of this implementation is that the critical path for the STORE operation becomes very long, and the cycle time increase is not acceptable.

An example of an error correction technique known in the prior art is disclosed by H. T. Olnowich et al. in "Error Correction Technique Which Increases Memory Bandwidth and Reduces Access Penalties", *IBM Technical Disclosure Bulletin*, vol. 31, no. 3, August 1988, pp. 146 to 149. This technique, however, requires a dual redundant memory implementation and is intended to replace more costly, high-speed memory (static random access memory chips or SRAMs) with two banks of lower performance memory (dynamic random access memory chips or DRAMs). It is therefore not suitable for high performance cache applications. F. Tsui in "Memory Arrangement and Operation for Error Correction Without Cycle-time Prolongation", *IBM Technical Disclosure Bulletin*, vol. 16, no. 10, March 1974, pp. 3280, 3281, discloses a scheme in which a memory array for data bits is separated from a memory array for check bits, the two arrays being driven separately with the latter array having a time delay lagging the former. On a read operation, the data is assumed to be correct, and if an error is detected, the initiated operation with the uncorrected data is recalled and a new operation is started using corrected data. In this scheme, separated check bits for error correction on the minimum unit of STORE operation are required. Since most state-of-the-art architectures for digital systems (e.g., 370, VAX, 80386, etc.) have a byte as the minimum unit of the STORE operation, the overhead of this approach is very large. It is therefore not practical.

U.S. Pat. No. 4,748,627 to Ohsawa describes a memory system with an error correction function. The objective of this system is to avoid the accumulation of errors in a dynamic random access memory (DRAM), and while this is important, it addresses a completely different problem than that solved by the subject invention. U.S. Pat. No. 4,672,614 to Yoshida proposes to use two sets of address buffers. More specifically, the memory is provided with a pair of row address buffers which can operate independently, and when an error correcting operation is performed for the data related to the address contents of one of the buffers, the access operation of the data cell array is conducted by the other of the buffers, thereby enabling the memory to simultaneously carry out parts of the operation of successive read-out operations.

SUMMARY OF THE INVENTION

It is therefore an object of the present invention to provide an error checking and correction function for cache memories without increasing the normal cache access time.

It is another object of the invention to provide a new memory organization which implements an effective two port cache array, yet has the density of a conventional single port cache array.

According to the invention, there is provided a new scheme for the implementation of single error correction, double error detection function for cache memories wherein the normal cache access time is not affected by the addition of the ECC function. Broadly described, check bits are provided for multiple bytes of data, thereby lowering the overhead of the error detecting and correcting technique. When a single error is detected, a cycle is inserted by the control circuitry of the cache chip and the CPU chip.

In the preferred embodiment, error correction on multi-byte data is performed using, for example, the 72/64 Hamming code. The technique according to the invention for a one-cycle cache design would normally require a 2-port cache array (one write port, and one read port). However, the density of a true 2-port array is too low; therefore, the invention is implemented with a 1-port array using a time multiplexing technique, providing an effective 2-port array but with the density of a single port array.

BRIEF DESCRIPTION OF THE DRAWINGS

The foregoing and other objects, aspects and advantages will be better understood from the following detailed description of a preferred embodiment of the invention with reference to the drawings, in which.

DETAILED DESCRIPTION OF A PREFERRED EMBODIMENT OF THE INVENTION

Figure 1:
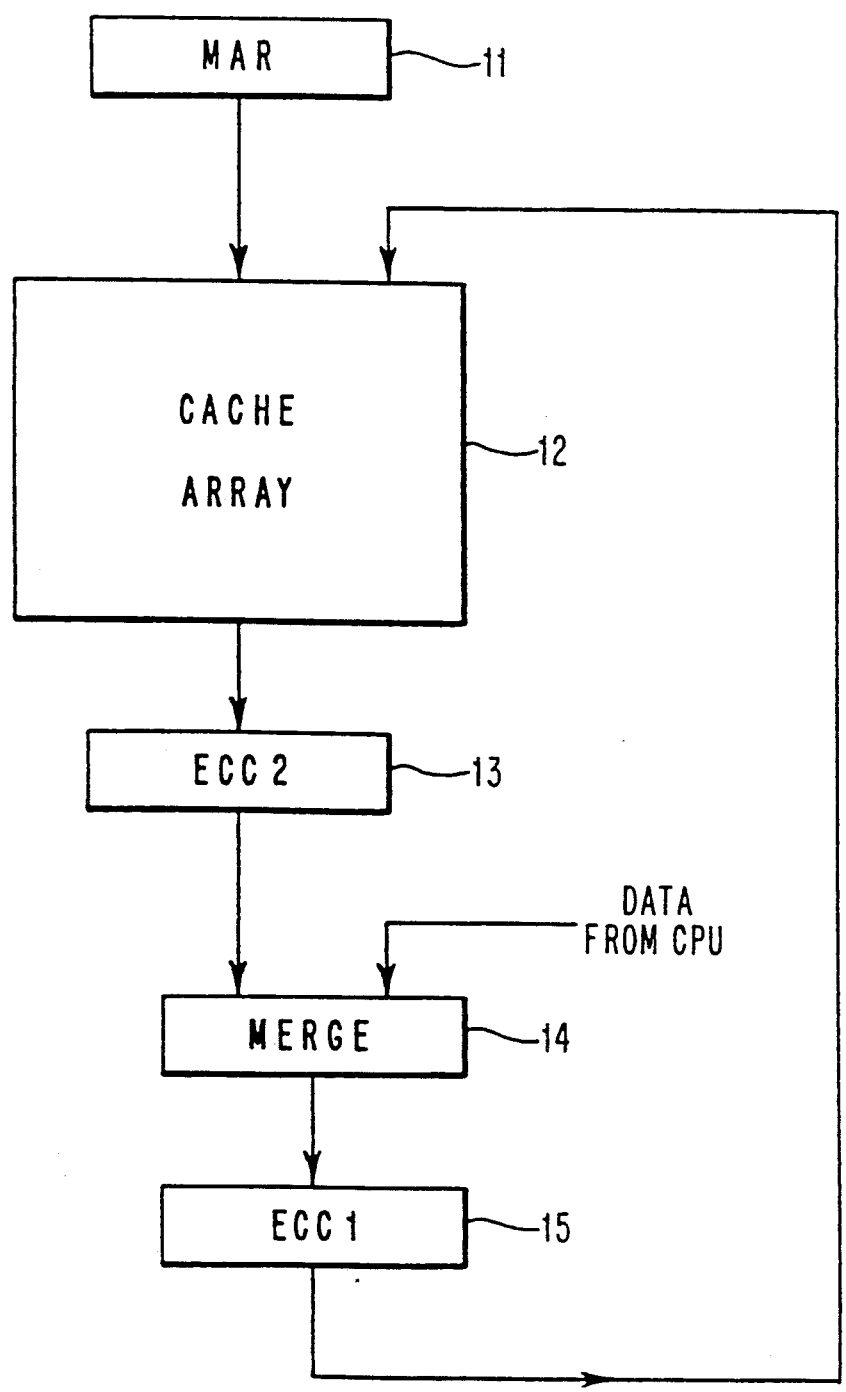
FIG. 1 is a data flow diagram illustrating the operation of a straightforward implementation of an ECC cache with a 72/64 Hamming code.
Figure 2:
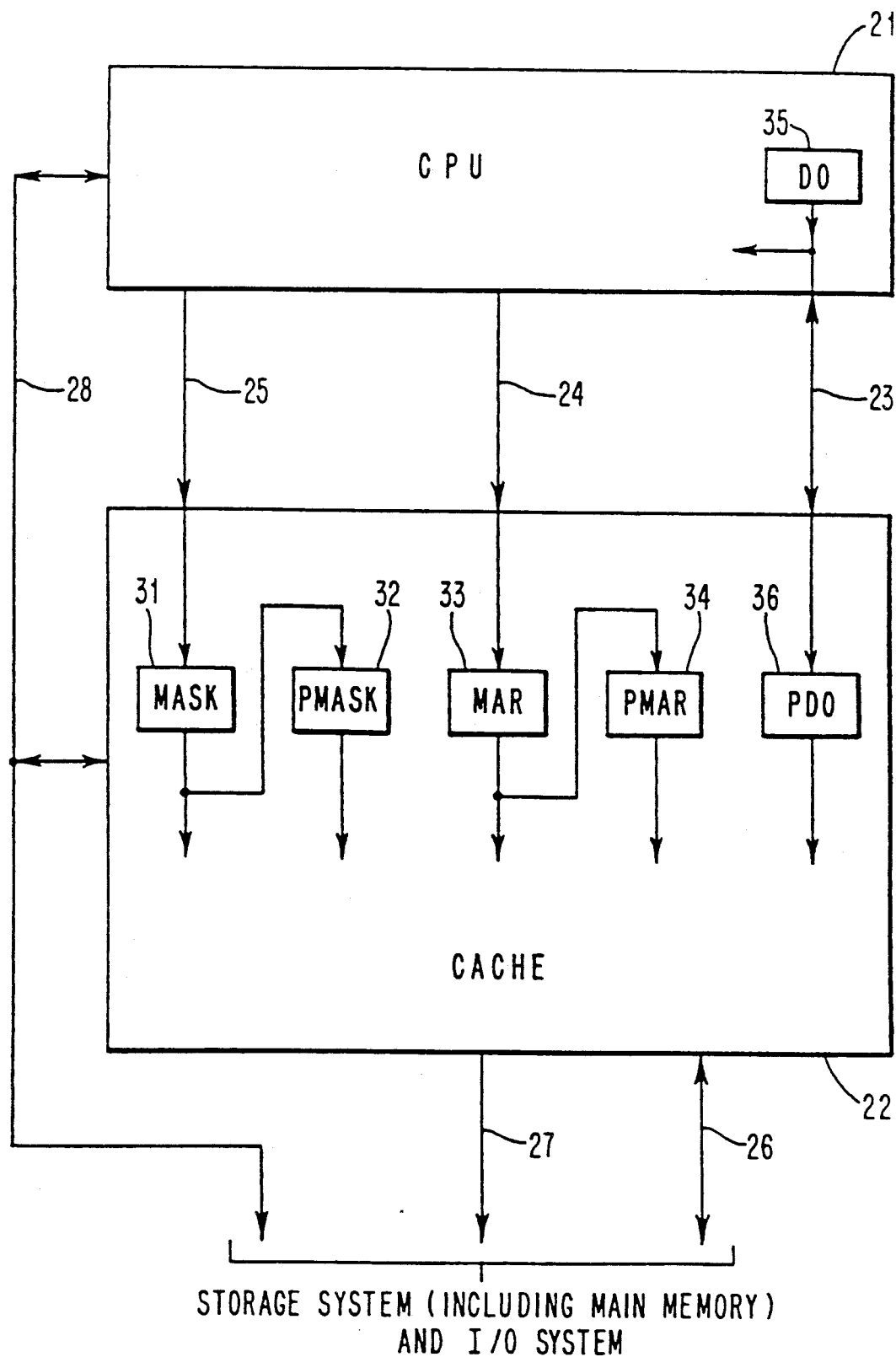
FIG. 2 is a block diagram of the overall processor system including a central processor unit and a cache.

Referring now to the drawings, and more particularly to FIG. 2, there is shown an organization of a processor unit of a general purpose digital computer. More particularly, the processor unit comprises a CPU (central processing unit) 21 and a cache memory 22 connected between the CPU 21 and the storage system, including main memory, and the input/output (I/0) system. Three buses provide the connection between the CPU 21 and the cache memory 22. These are a double word (64 bits) bi-directional data bus 23, a 31-bit address bus 24 and a control bus 25. The control bus 25 carries control information which indicates the location of the byte to be modified in the double word during a STORE operation. In addition, there are a bi-directional data bus 26 and an address bus 27 between cache 22 and the storage system and the I/0 system. Control signals are carried on lines 28 between CPU 21, cache 22 and the storage system and I/0 system.

Within the cache 22, there are several registers. These are a MASK register 31, PMASK register 32, a memory address register (MAR) 33, a PMAR register 34, and a PDO register 36, corresponding to the data out (DO) register 35 in the CPU 21. The PMASK register 32 stores the content of the MASK register 31 from the previous cycle. Similarly, the PMAR register 34 stores the content of the MAR register 33 from the previous cycle, and the PDO register 36 stores the content of the DO register 35 from the previous cycle. These registers are non-architecture pipeline registers and are assumed to be composed of edge triggered D-type flip-flops in this particular embodiment.

Figure 3:
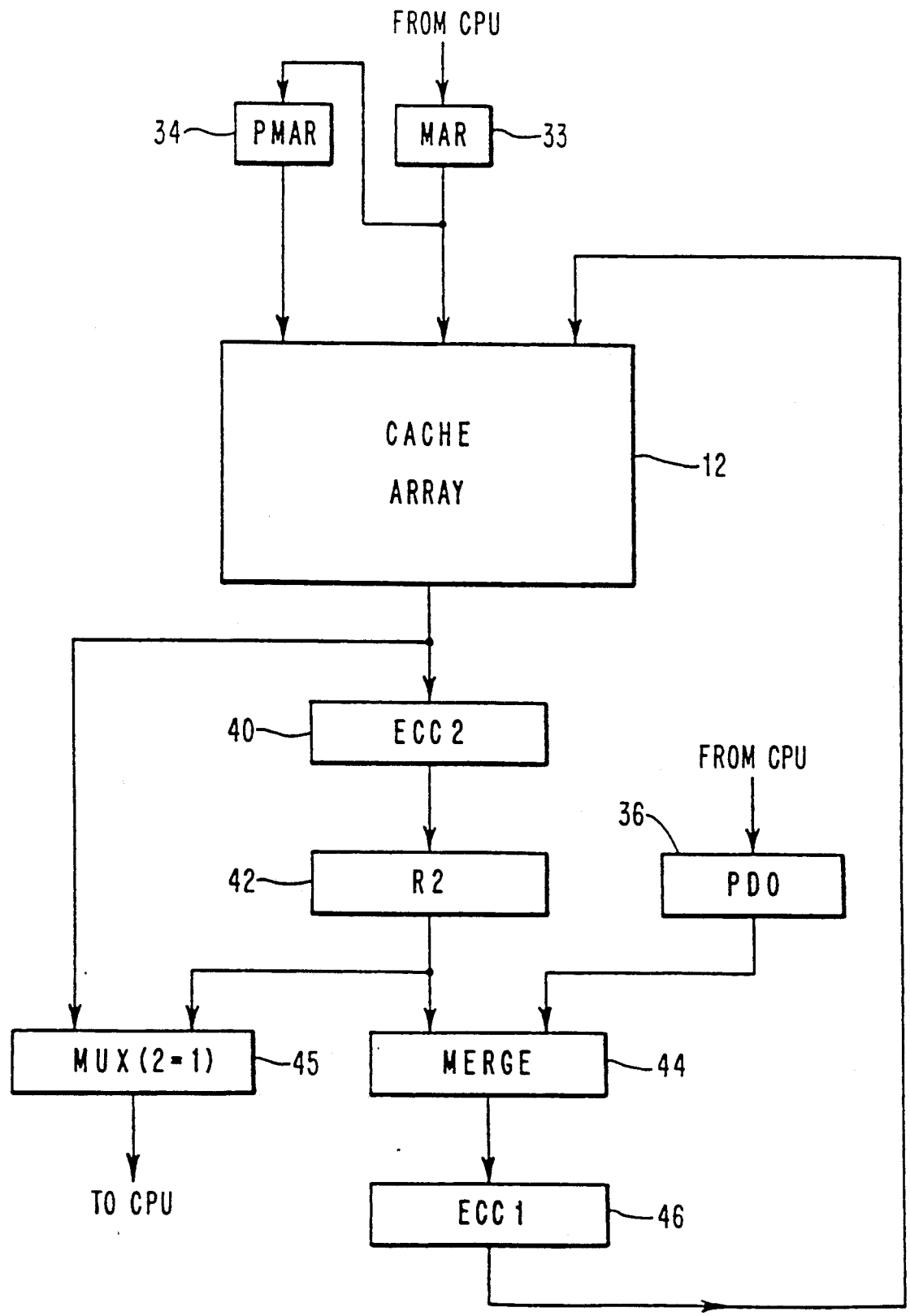
FIG. 3 is a block diagram showing the data path of the cache implementation according to the invention.

The data path of a cache implementation according to the invention is illustrated in FIG. 3. The operation of this cache is best understood by going through the data flow for a STORE operation and a FETCH operation as described in the following sections. In this example, the error correction scheme of a 72/64 Hamming code is assumed.

I) STORE operation

1st Cycle

Assuming the byte needs to be stored is the M1 byte in the double word with address A1 (real address), in the first cycle, address A1 and the location of the byte to be stored (M1) are generated in the CPU and sent to the cache array 12, and data to be stored (D1) is generated in the CPU 21.

2nd Cycle

At the beginning of the second cycle, M1, A1 and D1 are latched into MASK register 31, MAR register 33 and DO register 35, respectively. The contents of MASK register 31, MAR register 33 and DO register 35 in the first cycle are latched into PMASK register 32, PMAR register 34 and PDO register 36, respectively. Address A1 is also used as the address to read out the double word and associated check bits from the cache array 12. The output then goes to Hamming circuit ECC2 40 to generate the error flags and corrected data for a single error. The detection of the error is early enough in the cycle so that the control circuitry of the cache has enough time to decide the action for the next cycle.

3rd Cycle

The results from ECC2 40 are latched into pipeline register R2 42 at the beginning of the third cycle. The pipeline registers MASK 31, PMASK 32, MAR 33, PMAR 34, DO 35, and PDO 36 are also updated at the beginning of the cycle.

For the case of normal operation (no error flag generated by ECC2 40) and a single error, the corrected data (content of register R2 42) is merged at 44 with the data D1 (content of PDO register 36) according to the content of PMASK register 32. The result then goes to a Hamming circuit ECC1 46 to generate check bits. The new double word and associated check bits are then written to the cache array 12 at address A1 (the content of PMAR register 34).

For the case of double error detection, the problem cannot be fixed by the ECC hardware. The flag of the double error is sent back to the CPU 21 to evoke the exception handling routine in software.

Although the STORE operation requires three cycles to complete, it can be pipelined to achieve an effective one cycle STORE with a 2-port cache array (one read port for the address as the content of MAR register 33, and one write port for the address as the content of PMAR register 34). However, the density of a true 2-port array is too low to be practical. Therefore, a new cache array implementation is provided to solve this problem.

The data flow of this cache, as illustrated in FIG. 3, shows that the reading of the cache array 12 needs to be completed in the first part of the cycle so that there is enough time left for the Hamming circuitry ECC2 40. Further examination of the timing of a conventional SRAM indicated that the read operation will not be affected if the bitlines of the SRAM array are decoupled from the I/0 lines once there is enough differential signal developed at the I/0 lines, and this is normally achieved in the first half of the cycle. On the other hand, the write operation need only be completed before the end of the cycle. Therefore, it is logical to assume that a single port SRAM cell array can be timely multiplexed to meet the requirement.

Figure 4:
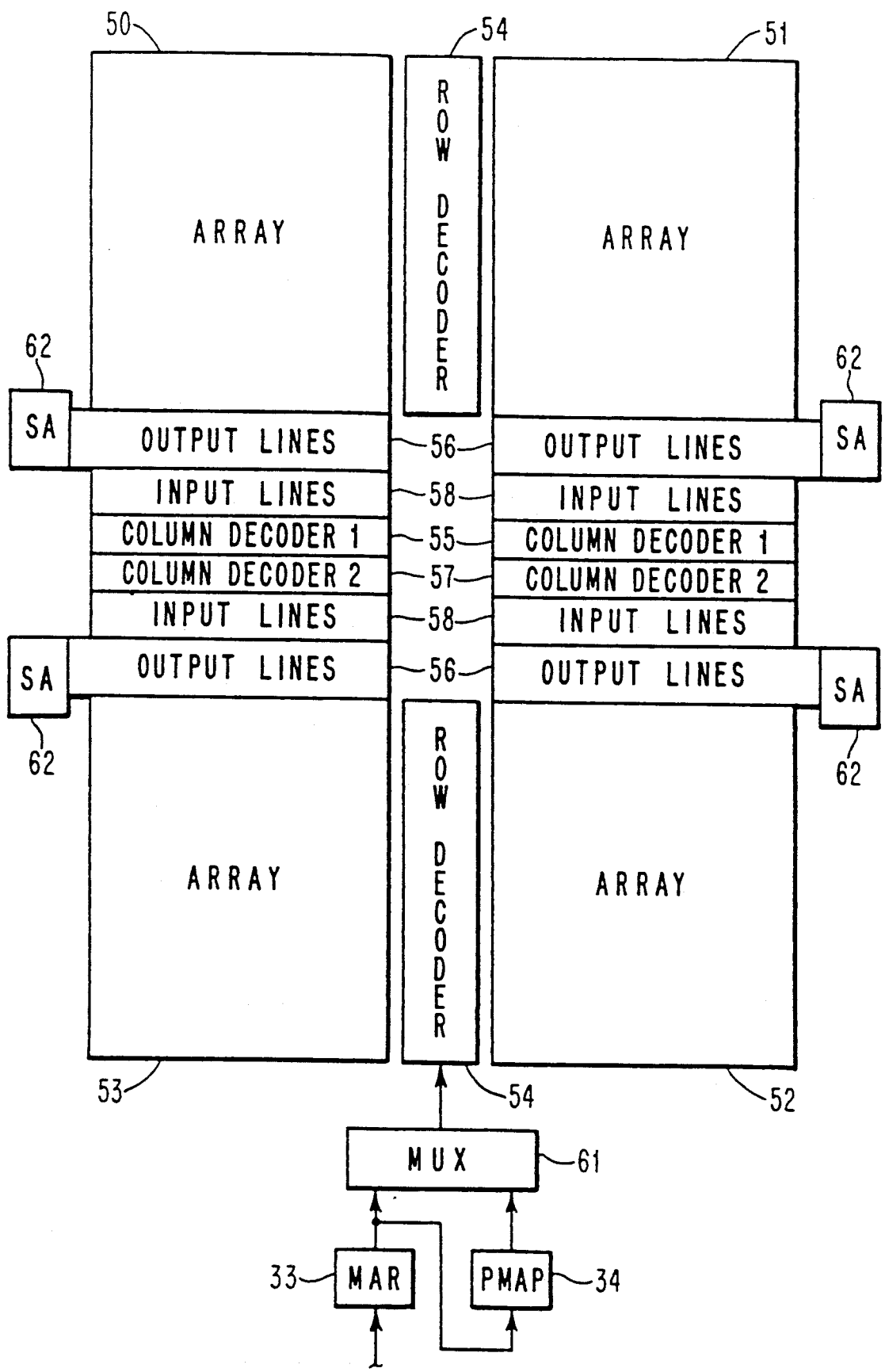
FIG. 4 is a block diagram showing the organization of a 2K×72 cache array according to one aspect of the invention.
Figure 5:
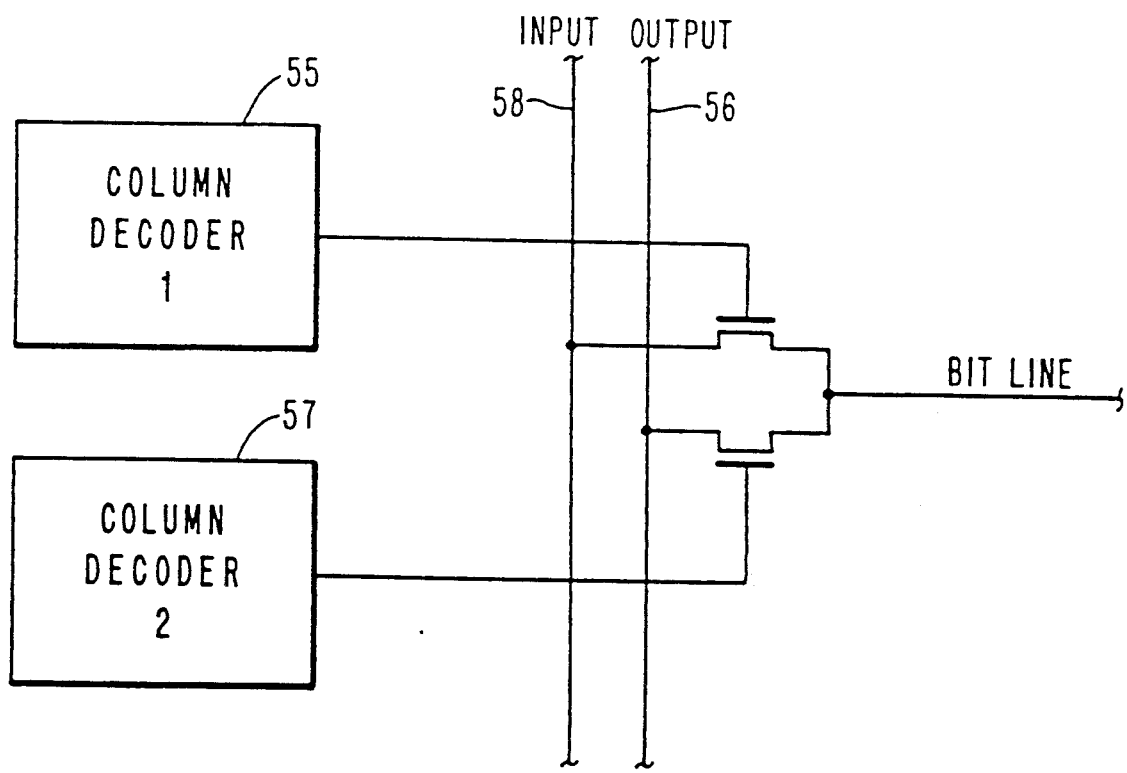
FIG. 5 is block and schematic diagram showing how the bitlines of the cache array are connected to the input lines and output lines.

FIG. 4 shows an organization of a 2K×72 cache array according to a preferred embodiment of the invention. More particularly, the cache array comprises four 36K block arrays 50, 51, 52, and 53 arranged in four quadrants. The memory cell arrays are implemented with conventional single port SRAM cells and one ROW decoder 54 to achieve the density of the conventional single port cache array. However, unlike a conventional SRAM array, the input and output of this cache array are separated, and it comprises two column decoders 55 and 57, rather than the usual one. Column decoder 55 is only activated during the first half of the cycle, and it uses the content of MAR register 33 as an input address and controls the bit switches (pass transistors) from the bitlines to the output lines 56, as shown in more detail in FIG. 5. Column decoder 57 is only activated during the second half of the cycle (non-overlapping with that of column decoder 55), it uses the content of PMAR register 34 as an input address and controls the bitswitches (pass transistors) from the bitlines to the input lines 58 as shown in FIG. 5.

During the first half of the cycle, the output from MAR 33 is selected by multiplexer 61 as the input address for the row decoder 54. Bitlines are connected to the output lines 56 as selected by column decoder 55 to read out data at the address as the content of MAR register 33. Bitline voltage swing limiting circuits as used in conventional SRAM designs should be used to avoid large voltage swings which may cause unintentional changing of the content of the cells on the wordline selected in the second half of the cycle. Examples of such circuitry are described, for example, in "A 3.5-ns/77K and 6.2-ns/300K 64K CMOS RAM with ECL Interfaces" by Terry I. Chappell et al., at pages 859 to 867, and "An 8-ns 256K BiCMOS RAM" by Nobuo Tamba et al., at pages 1021 to 1026, both published in *IEEE Journal of Solid-State Circuits*, vol. 24, no. 4, August 1989.

At the second half of the cycle, the output from PMAR register 34 is selected by multiplexer 61 as the input address for the row decoder 54. Bitlines are connected to the input lines 58 as selected by column decoder 57 to write data at the address as the content of PMAR register 34.

II) FETCH operation

1st Cycle

Assuming data to be fetched is a double word with address A2 (real address), at the first cycle, A2 is generated in the CPU 21 and sent to the cache 22. See FIG. 3.

2nd Cycle

At the beginning of the second cycle, address A2 is latched into MAR register 33. Address A2 is also used as the address to read out the double word and associated check bits from the cache array 12. The output of the cache array 12 is selected by multiplexer 45 and sent to CPU 21 unless address A2 is the same as the address of a STORE cycle immediately preceding this FETCH cycle. In that case, the output from the cache array 12 has not yet been updated, and the content in register R2 42 is sent to CPU 21, as selected by the multiplexer 45.

The output from cache array 12 also goes to Hamming circuit ECC2 40 to generate the error flags and corrected data for a single error.

The detection of the error is early enough in the cycle so that the control circuitry of the cache 22 has enough time to decide the action for the next cycle. The control circuit will prevent the update of the pipeline registers (MASK 31, PMASK 32, MAR 33, PMAR 34, DO 35, and PDO 36) at the beginning of the next cycle in this situation. The error flag is also sent to the CPU 21 to notify it that the data just sent is not correct and the corrected data will be re-sent at the next cycle.

3rd Cycle

This cycle is only needed for the case of a single error and is inserted by the control circuitry of the cache. The results from ECC2 40 are latched into pipeline register R2 42 at the beginning of the third cycle and then sent to CPU 21 as selected by multiplexer 45. To avoid the accumulation of errors, the corrected data in register R2 42 needs to be written back to the cache array 22 through the merge 44 and the Hamming circuitry 46 as shown in FIG. 3. The error flags are also sent to the CPU 21. However, due to the chip-crossing delay, these signals cannot be received before the end of the cycle, and it is too late for the control circuits of the CPU to react. But there is enough time to hold the clock for the following cycle.

Figure 6:
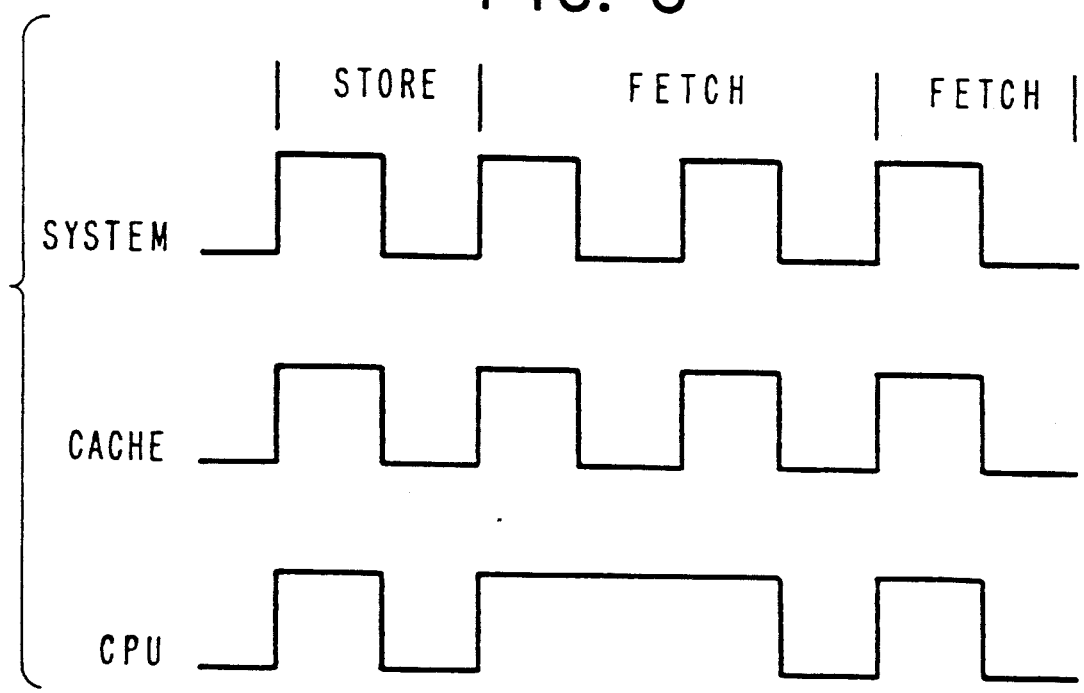
FIG. 6 is a timing diagram showing the operation of the ECC cache system according to the invention when a single error is detected.

The clock signals (CLKs) for a STORE-FETCH-FETCH cycle with a single error detected during a STORE operation are shown in FIG. 6. The CLKs for the execution unit of the CPU and are held high until released by the cache chip. Here, the CPU and the MMU (memory management unit) are designed such that the machine state is modified during CLK low so that for the CPU and the MMU, the cycle is just extended for two clock periods. In this particular case, it is released in the next cycle. The cycle just extends to two clock periods. The operation of the cache chip with this additional clock cycle is almost the same as a regular cycle. The use of the multiplexer 45 provides a bypass that eliminates the delay of the Hamming circuit ECC2 40 from the critical path of the FETCH operation, thereby reducing the cycle time. The use of pipeline registers R2 42, PMASK 32, PMAR 33, and PDO 36 to pipeline the STORE operation also reduce the cycle time.

While the invention has been described in terms of a single preferred embodiment, those skilled in the art will recognize that the invention can be practiced with modification within the spirit and scope of the appended claims.

Having thus described our invention, what we claim as new and desire to secure by Letters Patent is as follows:

1. A pipelined error checking and correcting cache memory for a central processing unit comprising:

cache array means for reading out data during a first half of a memory cycle and writing in data during a second half of memory cycle, said cache array means providing an effective two port memory array with the density of a single port array;

first, second, third, fourth, fifth, sixth, and seventh pipelined register means, said first register means storing a mask, said second register means being connected to said first register means and storing a previous mask, said third register means storing a memory address, said fourth register means being connected to said third register means and storing a previous memory address, said fifth register means storing data output from said central processing unit, said sixth register means being connected to said fifth register means and storing a previous data output, and said seventh register means storing an output from said cache array means;

first address means responsive to said third register means for addressing said cache array means during said first half of said memory cycle and second address means responsive to said fourth register means for addressing said cache array means during said second half of said memory cycle;

first error checking and correcting means connected between an output of said cache array means and said seventh register means for generating error flags and corrected data, said corrected data being latched in said seventh register means;

merge circuit means responsive to said second register means for merging data latched in said seventh register means with data from said central processing unit; and second error checking and correcting means connected between said merge circuit means and an input to said cache array means for generating check bits for an output of said merge circuit means before writing said output with the check bits in the cache array means at an address corresponding to a content of said fourth register means during said second half of said memory cycle.

2. The pipelined error checking and correcting cache memory as recited in claim 1 further comprising multiplexer means responsive to outputs from the cache array means and the seventh register means for providing one of said outputs to said central processing unit, said multiplexer means selecting the output of said cache array means unless an address in said forth register means is the same as said third register means following a store cycle, in which case the output of said seventh register means is selected by said multiplexer means.

3. The pipelined error checking and correcting cache memory recited in claim 1 wherein said cache array means comprises:

an array of single port static random access memory cells connected to a plurality of bitlines;

row decoder means and first and second column decoder means for addressing said array; and respective input and output lines connected to each of said bitlines by first and second pluralities of pass transistors, said first and second pluralities of pass transistors being respectively controlled by said first and second column decoder means for connecting said bitlines to said output and input lines, respectively.

4. A cache memory array providing an effective two port memory array with the density of a single port array, said cache memory array permitting an effective read and write operation in one memory cycle, comprising:

an array of single port static random access memory cells connected to a plurality of bitlines;

addressing means for reading out data from said array during a first half of a memory cycle and writing in data in to said array during a second half of a memory cycle, said addressing means including row decoder means and first and second column decoder means for addressing said array, said first column decoder means addressing said array during said first half of said memory cycle and said second column decoder means addressing said array during said second half of said memory cycle; and respective input and output lines connected to each of said bitlines by first and second pluralities of pass transistors, said first and second pluralities of pass transistors being respectively controlled by said first and second column decoder means for connecting said bitlines to said output and input lines, respectively.

* * * * *